United States Patent
Xin et al.

(10) Patent No.: US 10,935,435 B2
(45) Date of Patent: Mar. 2, 2021

(54) TEMPERATURE MONITORING DEVICES FOR ELECTRICAL APPARATUS, SWITCHGEARS WITH SAME AND RELATED METHODS

(71) Applicant: Eaton Intelligent Power Limited, Dublin (IE)

(72) Inventors: Chao Xin, Shanghai (CN); Yazhou Wang, Shanghai (CN); Binghua Wu, Shanghai (CN); Xu Zhu, Shanghai (CN); Xin Zhou, Moon Township, PA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/682,253

(22) Filed: Nov. 13, 2019

(65) Prior Publication Data

US 2020/0080900 A1    Mar. 12, 2020

Related U.S. Application Data

(62) Division of application No. 15/467,914, filed on Mar. 23, 2017, now Pat. No. 10,514,304.

(51) Int. Cl.
| | | |
|---|---|---|
| G01K 1/00 | (2006.01) |
| G01K 13/00 | (2021.01) |
| G01K 1/143 | (2021.01) |
| F16B 5/02 | (2006.01) |
| F16B 2/06 | (2006.01) |

(52) U.S. Cl.
CPC .............. *G01K 1/143* (2013.01); *F16B 2/065* (2013.01); *F16B 5/0233* (2013.01)

(58) Field of Classification Search
USPC ................................. 374/152, 163, 141, 208
See application file for complete search history.

(56) References Cited

U.S. PATENT DOCUMENTS

| | | |
|---|---|---|
| 4,728,887 A | 3/1988 | Davis |
| 4,794,327 A | 12/1988 | Fernandes |
| 4,847,780 A | 7/1989 | Gilker et al. |

(Continued)

FOREIGN PATENT DOCUMENTS

| | | |
|---|---|---|
| CN | 101975617 A | 2/2011 |
| CN | 202075053 U | 12/2011 |

(Continued)

OTHER PUBLICATIONS

Extended European Search Report corresponding to related European Patent Application No. 18163190.4 (8 pages) (dated Aug. 24, 2018).

*Primary Examiner* — Mirellys Jagan
(74) *Attorney, Agent, or Firm* — Myers Bigel, P.A.

(57) ABSTRACT

Temperature monitoring devices have a primary body with an inner circular perimeter, a temperature monitoring segment held by the primary body, the temperature monitoring segment comprising an inwardly extending thermal probe, and a fastener assembly segment held by the primary body at a location that is circumferentially spaced apart from the temperature monitoring segment. The fastener assembly segment has a circumferentially extending bracket that can be radially extended in a direction that is toward the inner circular perimeter of the device.

20 Claims, 8 Drawing Sheets

(56) References Cited

U.S. PATENT DOCUMENTS

| | | | |
|---|---|---|---|
| 5,341,088 | A | 8/1994 | Davis |
| 5,753,875 | A | 5/1998 | Benke et al. |
| 6,779,919 | B1 | 8/2004 | Staniforth et al. |
| 7,145,322 | B2 | 12/2006 | Solveson et al. |
| 7,253,602 | B2 | 8/2007 | Shvach et al. |
| 7,956,763 | B2 | 6/2011 | Mies |
| 2007/0116087 | A1 | 5/2007 | Hsu |
| 2010/0013457 | A1 | 1/2010 | Nero, Jr. |
| 2013/0022078 | A1 | 1/2013 | Phillips et al. |
| 2014/0177672 | A1* | 6/2014 | Davis .................. G01R 1/20 374/152 |
| 2015/0015244 | A1 | 1/2015 | Ray et al. |
| 2016/0356852 | A1* | 12/2016 | Lee .................. G01R 31/327 |

FOREIGN PATENT DOCUMENTS

| | | |
|---|---|---|
| CN | 202734983 | 2/2013 |
| CN | 204029136 | 12/2014 |
| CN | 104344901 | 2/2015 |
| GB | 2281123 | 2/1995 |

\* cited by examiner

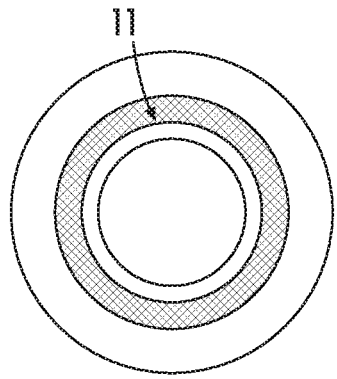
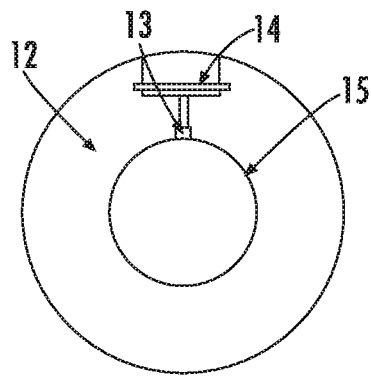
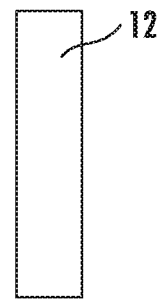
FIG. 1A (PRIOR ART)　　FIG. 1B (PRIOR ART)　　FIG. 1C (PRIOR ART)
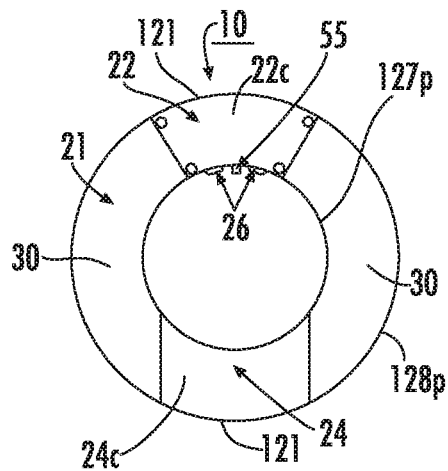
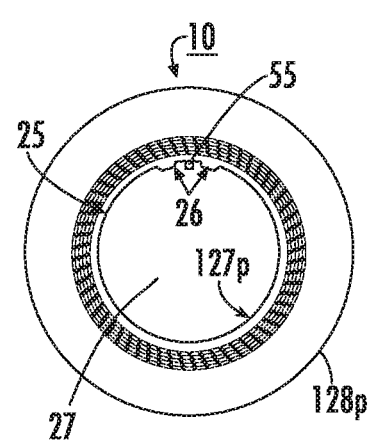
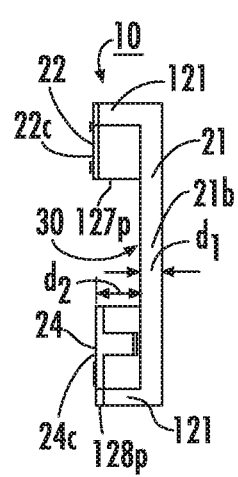
FIG. 2A　　FIG. 2B　　FIG. 2C

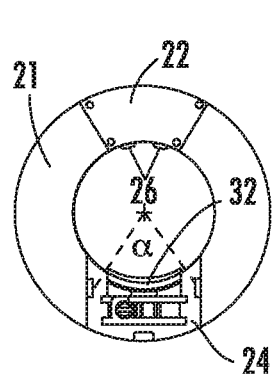
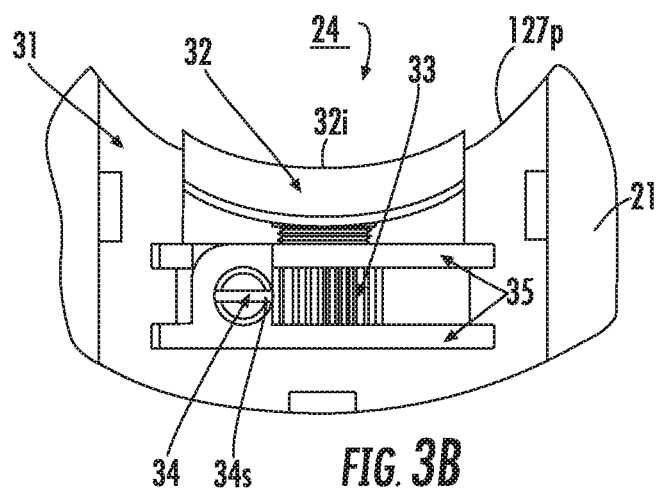
FIG. 3A     FIG. 3B
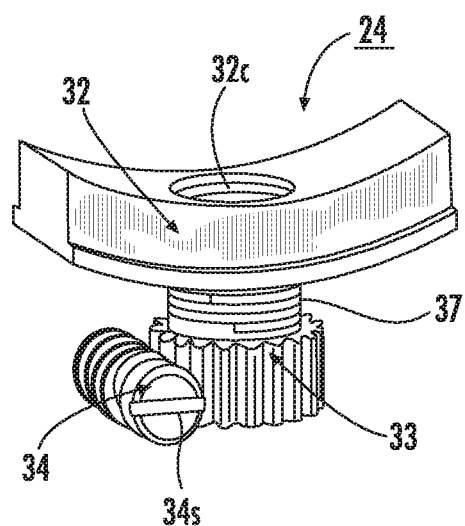
FIG. 4

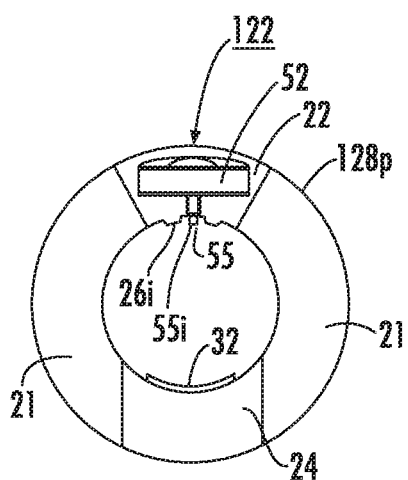 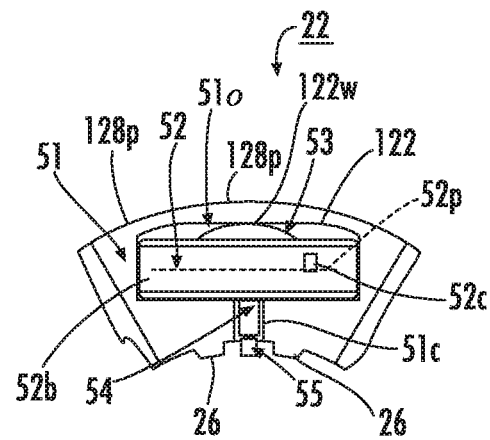
FIG. 5A  FIG. 5B
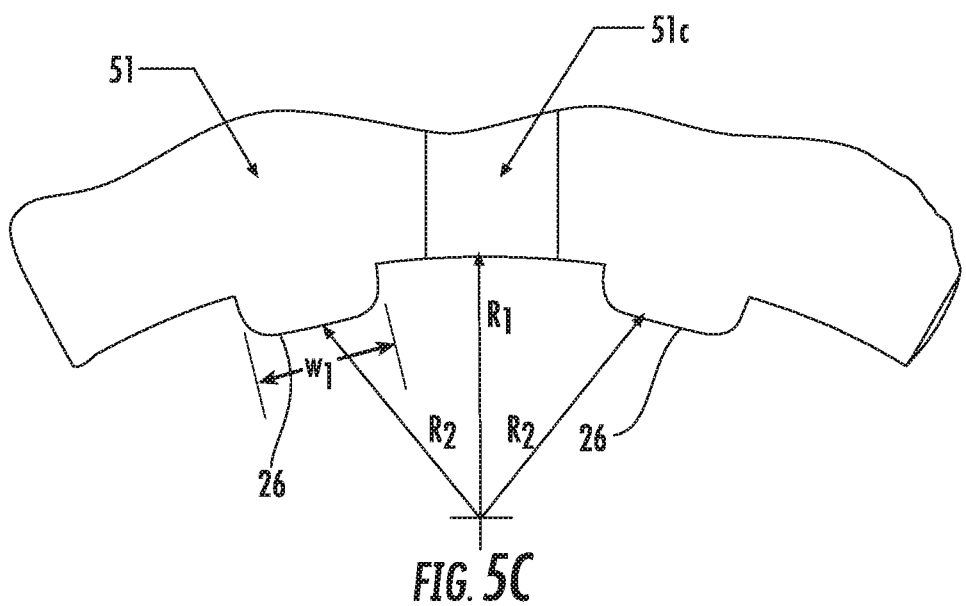
FIG. 5C

TEMPERATURE MONITORING DEVICES FOR ELECTRICAL APPARATUS, SWITCHGEARS WITH SAME AND RELATED METHODS

RELATED APPLICATION

This application is a divisional application of U.S. patent application Ser. No. 15/467,914 filed Mar. 23, 2017, the contents of which are hereby incorporated by reference as if recited in full herein.

FIELD OF THE INVENTION

The present disclosure relates to temperature sensor assemblies particularly suitable for switchgears.

BACKGROUND OF THE INVENTION

Known temperature monitoring devices on the market today are mostly circular. That means the devices encircle the contacts to measure the temperature of the certain points inside a device such as a switchgear cabinet.

FIG. 1A, FIG. 1B and FIG. 1C illustrate a conventional temperature monitoring device. The device includes a current transformer (CT) coil 11 with an iron core for energy harvesting and a main body of the measuring device 12. The device also includes a thermal sensor 13 such as a digital wireless thermal sensor and a printed circuit board (PCB) 14 with a processor and wireless chip. The temperature measurement device can have an inner perimeter extending about a circular open center aperture 15 that receives/encircles a contact of an electrical apparatus such as a switchgear. The entire circumference of the contact is covered by the inner perimeter of the device which can result in poor heat dissipation performance.

Also, the conventional temperature monitoring device has two fastening screws to affix itself to the contact and the sensor probe is fixed to the inner perimeter circle and can't be adjusted. As a result, the sensor probe may not be properly positioned because of manufacturing variabilities. Thus, the sensor probe may not touch the contact surface thoroughly which can also influence the measurement accuracy and/or performance.

SUMMARY OF EMBODIMENTS OF THE INVENTION

Embodiments of the present invention provide devices that allow improved installation methods which ensure a robust touch between a thermal probe and a target contact which can also avoid or reduce heat dissipation performance degradation.

Embodiments of the invention provide a fastener assembly with a gear structure for fastening the temperature monitoring device to a contact.

Embodiments of the invention provide an adjustment assembly with a double-adjustable structure for a sensor probe to cause the sensor probe to abut a contact surface.

Embodiments of the invention can improve heat dissipation performance using a gear structure.

Embodiments of the invention provide small adjacent convexly curved members on an inner facing perimeter to reduce a contact area with the target contact.

Embodiments of the invention are directed to temperature monitoring devices. The devices include: a primary body with an inner circular perimeter and a temperature monitoring segment held by the primary body. The temperature monitoring segment has an inwardly extending thermal probe. The device also includes a fastener assembly segment held by the primary body at a location that is circumferentially spaced apart from the temperature monitoring segment. The fastener assembly segment has a circumferentially extending bracket that can be radially extended in a direction that is toward the inner circular perimeter of the device.

The temperature monitoring segment can have first and second inwardly projecting members, one on each side of the thermal probe.

The first and second projecting members comprise an elastic material, optionally with chamfered edges and/or a convexly curved inner facing surface.

The first and second projecting members are at least one of flexible or comprise an elastic material.

The first and second projecting members can optionally be compressible so as to be able to compress radially outward in a range between 1-20% in response to a force applied during installation to a target contact.

The temperature monitoring segment can also include an inner shell holding a digital wireless temperature sensor that is attached to the probe and an outer shell that encloses the inner shell. The outer shell can have a radially inwardly extending bracket that encloses a length of a leg of the thermal probe that extends between the temperature sensor and the thermal probe. The segment can also include at least one inner resilient member residing between the inner shell and the outer shell and at least one outer resilient member residing between the outer shell and an outer perimeter of the temperature monitoring device. During installation and application of a force onto the thermal probe, the at least one inner resilient member can compress so that the inner shell moves relative to the outer shell to retract the probe against a distal end of the bracket and the at least one outer resilient member can compress when the inner and outer shell move together radially outward toward the outer perimeter of the device.

The at least one inner resilient member can be provided as first and second spaced apart leaf springs.

The at least one outer resilient member can be a single leaf spring held in a shaped cavity of a housing member of the temperature monitoring segment.

The device can have an inner open circular channel and an outer circular perimeter. The primary body can have a longitudinal extent that is less than a longitudinal extent of the temperature monitoring segment and the fastener assembly segment to thereby provide ventilation spaces.

The bracket can have an arcuate inwardly facing surface with a radius of curvature corresponding to a radius of the inner circular perimeter of the device.

The bracket can have a threaded center channel that receives a threaded bolt.

The fastener assembly segment can have a first gear that cooperates with a second gear that can move the fastener bracket.

The first gear can be a worm gear and the second gear can be a wheel gear. The wheel gear can be attached to a threaded bolt that extends into a threaded channel of the bracket to translate the bracket radially in response to rotation of the wheel gear by the worm gear.

The worm gear can have an outer facing end with a slot for a user to access to turn the worm gear and adjust a position of the bracket.

A medial location of the bracket of the fastener assembly segment can be diametrically opposed to the thermal probe.

Other embodiments are directed to switchgears. The switchgears have at least one temperature monitoring device and at least one contact that extends through an open circular channel of a respective temperature monitoring device. The temperature monitoring device includes a primary body comprising an inner circular perimeter and a temperature monitoring segment held by the primary body. The temperature monitoring segment has an inwardly extending thermal probe. The temperature monitoring segment has first and second projecting members, one on each side of the thermal probe. The temperature monitoring device also includes a fastener assembly segment held by the primary body at a location that is circumferentially spaced apart from the temperature monitoring segment. The fastener assembly segment includes a circumferentially extending bracket that can be radially extended in a direction that is toward the inner circular perimeter of the device.

The first and second projecting members may have a convexly curved inner facing surface.

The temperature monitoring segment can further include an inner shell holding a digital wireless temperature sensor that is attached to the probe and an outer shell that encloses the inner shell. The outer shell can have radially inwardly extending bracket. The bracket can enclose a length of a leg of the thermal probe that extends between the temperature sensor and the thermal probe. The temperature monitoring segment can also have at least one inner resilient member residing between the inner shell and the outer shell and at least one outer resilient member residing between the outer shell and an outer perimeter of the temperature monitoring device. During installation and application of a force onto the thermal probe, the at least one inner resilient member can compress so that the inner shell moves relative to the outer shell to retract the probe against a distal end of the bracket. The at least one outer resilient member can compress when the inner and outer shell move together radially outward toward the outer perimeter of the device.

The fastener assembly segment can include a worm gear attached to a wheel gear. The wheel gear can be attached to a threaded bolt that extends into a threaded channel of the bracket to translate the bracket radially in response to rotation of the wheel gear by the worm gear. A medial location of the bracket of the fastener assembly segment can be diametrically opposed to the thermal probe.

Yet other embodiments are directed to methods of installing a temperature monitoring device into a switchgear. The methods include: (a) providing a temperature monitoring device with an open center channel, a fastener assembly segment and a spaced apart temperature measuring segment, the temperature measuring segment including a thermal probe; (b) placing the temperature monitoring device about a circumference of a contact of a switchgear so that the contact extends through the open center channel; (c) radially advancing a circumferentially extending bracket of the fastener assembly toward the contact to align the device with an outer surface of the contact; and (d) compressing at least one (typically a plurality) resilient member of the temperature measurement segment to retract the thermal probe against a bracket while an exposed end of the probe touches the outer surface of the contact.

The device can have a primary body with ventilation gap spaces extending angularly between 30-90 degrees between the temperature monitoring segment and the fastener assembly segment which can vent heat and reduce heat dissipation performance degradation.

The temperature monitoring segment can include an outer shell enclosing an inner shell holding a bracket that encloses a length of a leg extending between a primary body of the temperature sensor and the thermal probe and with at least one resilient member between the outer shell and the inner shell and the compressing can include first translating the probe to contact an end of the bracket, then translating the inner and outer shells concurrently to compress an outer resilient member; and/or the temperature monitoring segment can comprise first and second outwardly extending members, one on each side of the temperature probe that touch the outer surface of the contact and these member may further optionally have convex curved surfaces.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 1A is a back view of a prior art temperature measuring device.

FIG. 1B is a front view of the prior art device shown in FIG. 1A.

FIG. 1C is a side view of the device shown in FIGS. 1A and 1B.

FIG. 2A is a front view of a temperature measuring device according to embodiments of the present invention.

FIG. 2B is a back view of the device shown in FIG. 2A.

FIG. 2C is a side view of the device shown in FIGS. 2A and 2B.

FIG. 3A is a front view of the device shown in FIG. 2A but with a cover plate omitted to illustrate a fastener structure according to embodiments of the present invention.

FIG. 3B is an enlarged partial front view of the device shown in FIG. 3A illustrating the fastener assembly according to embodiments of the present invention.

FIG. 4 is an enlarged side perspective view of the fastener assembly shown in FIG. 3B.

FIG. 5A is a front view of the device shown in FIG. 2A but with a cover plate omitted to illustrate a temperature measurement segment according to embodiments of the present invention.

FIG. 5B is an enlarged partial front view of the device shown in FIG. 5A illustrating the at least one inwardly projecting member of the temperature measurement segment according to embodiments of the present invention.

FIG. 5C is a greatly enlarged partial front view of a portion of the temperature measurement segment (shown without the temperature probe or temperature sensor) according to embodiments of the present invention.

DETAILED DESCRIPTION OF EMBODIMENTS OF THE INVENTION

Figure 5D:
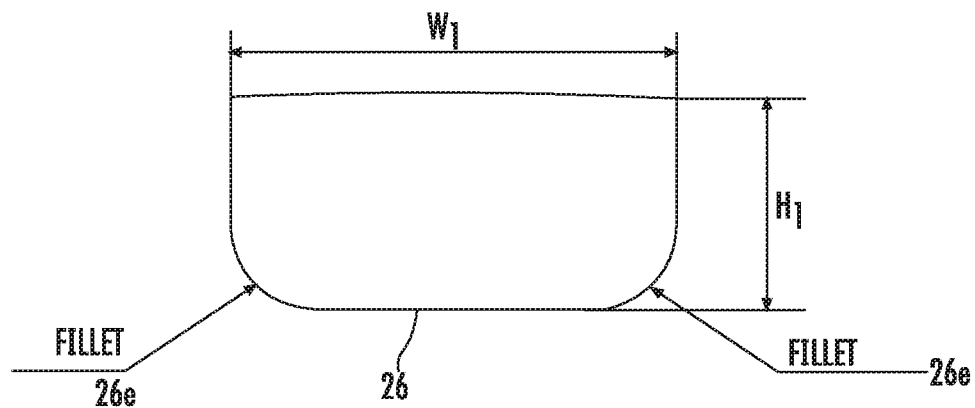
FIG. 5D is a greatly enlarged schematic illustration of an inwardly projecting member with according to embodiments of the present invention.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10'''). The terms "Fig." and "FIG." may be used interchangeably with the word "Figure" as abbreviations thereof in the specification and drawings. In the figures, certain layers, components or features may be exaggerated for clarity, and broken lines illustrate optional features or operations unless specified otherwise.

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Embodiments of the invention are particularly suitable for electrical power distribution devices such as switchgears. As employed herein the term "switchgear" includes, but is not be limited to, a circuit interrupter, such as a circuit breaker (e.g., without limitation, low-voltage, medium-voltage or high-voltage), a motor controller/starter, and/or any suitable device which carries or transfers current from one place to another.

As employed herein the term "power bus" shall expressly include, but not be limited by, a power conductor, a power bus bar, and/or a power bus structure for a circuit interrupter.

The present invention is described in association with a temperature monitoring device for a contact or other cylindrical conductor of a switchgear, although the invention can be applicable to a wide range of products.

FIGS. 2A-2C illustrate a temperature monitoring device 10 according to embodiments of the present invention. The device 10 has a primary body 21 with a circular inner perimeter 127p enclosing an open center aperture or channel 27. As shown, the device 10 may also have a circular outer perimeter 128p. A target contact (82, FIG. 8) for temperature measurement can extend through the channel 27. The device 10 can comprise or cooperate with a current transformer (CT) coil with a core 25 for energy harvesting. The device 10 can also include at least one inwardly projecting member 26, typically a plurality of members 26 shown as two, adjacent members 26. The at least one inwardly projecting member 26 can support the device 10 and reduce abutting contact surface area between the temperature measuring device 10 and a surface of a target contact.

The device 10 has a temperature measuring segment 22 with a temperature probe 55 (also interchangeably called a "thermal probe") and an adjustable assembly 122 shown inside a cover plate 22c in FIGS. 2A and 2C, for example. The sensor probe 55 abuts (i.e., touches) a surface of a target contact to measure the temperature. The thermal probe 55 can reside between neighboring inwardly projecting members 26. The thermal probe 55 can be attached to or an integral component of a thermal sensor 52 (FIGS. 5A, 5B) which can be a wireless digital thermal sensor such as part number DS18B20 from Maxim Integrated, San Jose, Calif. As employed herein, the term "wireless" means without a hard-wired or physical connection, without an electrical conductor and without an optical fiber or waveguide.

Figure 6:
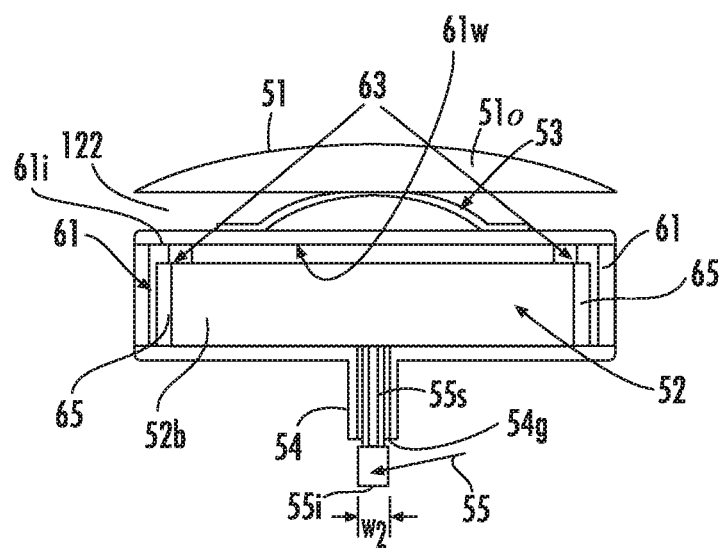
FIG. 6 is an enlarged front view of the adjustment assembly shown in FIG. 5B.

The at least one inwardly projecting member 26 can have a width $W_1$ that is greater than a width $W_2$ of the temperature probe 55, typically between 25%-200% the width of the temperature probe 55 as shown in FIGS. 5C, 5D and 6. The at least one inwardly projecting member 26 can project a distance forward of the inner perimeter 127$p$ of the device 10. The innermost edge of the probe 55$i$ and the innermost edge of 26$i$ of the at least one inwardly projecting member 26 can reside at the same radius R2 (FIG. 5C).

Referring to FIGS. 5C and 5D, the inwardly projecting member 26 can have a convexly curved shape such that the member 26 curves outward toward the center channel 27 and may have a radius of curvature R2 corresponding to the contact 82 (FIG. 13) to support the device 10. The inwardly projecting member 26 can comprise an elastic material, such as rubber.

Referring to FIG. 5D, the at least one inwardly projecting member 26 can have a width in a range of about 4 mm to about 8 mm and a height (projecting distance) in a range of 1.2 mm to about 3 mm.

During the assembling process, the device 10 can be fastened to the contact 82 (FIG. 8A) with the fastener assembly 24 comprising the cooperating gears. The contact 82 can be pressed to/against the at least one inwardly projecting member 26. The at least one inwardly projecting member can be one or more of resiliently configured, flexible, elastic and/or compressible with a degree of compression in a range of about 1%-20%, typically in a range of 5%-20% upon an applied contact force with the contact 82, and is more typically compressible 15% or less, such as 15%, 14%, 13%, 12%, 11%, 10%, 9%, 8%, 7%, 6%, and 5%, for example, to avoid inadvertent damage to the at least one inwardly projecting member 26.

Referring to FIGS. 5B and 5C, the at least one inwardly projecting member 26 can be convex to support the device 10. However, the at least one inwardly projecting member 26 can have other shapes such as a planar shape. The at least one inwardly projecting member 26 can have a radius of curvature R2 that is less than R1, which correspond to neighboring segments of the inner perimeter of the device 10, measured from the center of the circular inner perimeter of the primary body of the device.

FIG. 5D, for example, illustrates that the at least one projecting member 26 can have outer edges 26$e$ that are rounded (i.e., shaped as fillets). The inwardly projecting member 26 can be rectangular with a chamfer or rounding of exterior corners.

As shown in FIGS. 2A, 2B and 2C, the device 10 can also include a fastener assembly 24 that is positioned at a circumferentially spaced apart segment away from the temperature measuring segment 22. As shown, the fastener assembly 24 diametrically opposes the temperature segment 22.

Referring to FIGS. 3A, 3B, and 4, the fastener assembly 24 can include a circumferentially extending bracket 32 and cooperating gears 33, 34. The gears 33, 34 can also reside inside a respective cover plate 24$c$ (FIGS. 2A, 2C).

Referring to FIG. 2C, the primary body 21 can have a circular shape. The primary body 21 can have a longitudinal (axially extending) dimension $d_1$ that is less than a longitudinal (axially extending) dimension $d_2$ of the fastener assembly 24 and the adjustment assembly 22. Stated differently, the temperature measuring segment 22 and the fastener assembly segment 24 both have a greater extent in the longitudinal (axial) direction than the primary body 21, typically 2×-10× greater.

The primary body 21 can have a disk shaped support base 21$b$ with an open center 27 that has diametrically opposed outer perimeter arms 121 that extend a distance forward of the base 21$b$. The arms 121 can be arcuate and extend for a sub-length of the circumference to span only a respective outer perimeter of the fastener assembly 24 and the adjustment assembly 22. As shown in FIGS. 2A and 2C, the primary body 21 can provide ventilation and/or recess spaces 30 that are longitudinally spaced apart a distance from a surface of the target contact so that the device 10 does not contact the target contact its entire circumference as does the device and primary body 12 of the prior art device (FIG. 1C).

Referring to FIGS. 3A, 3B and 4, the fastener assembly 24 is shown according to embodiments of the present invention. The fastener assembly 24 includes cooperating gears 33, 34. As shown, the cooperating gears 33, 34 can include a worm gear 34 that engages an adjacent wheel gear 33 that is attached to the bracket 32. The bracket 32 can move radially, i.e., extend and/or retract in response to input from the gears 33, 34.

Figures 8A, 8B:
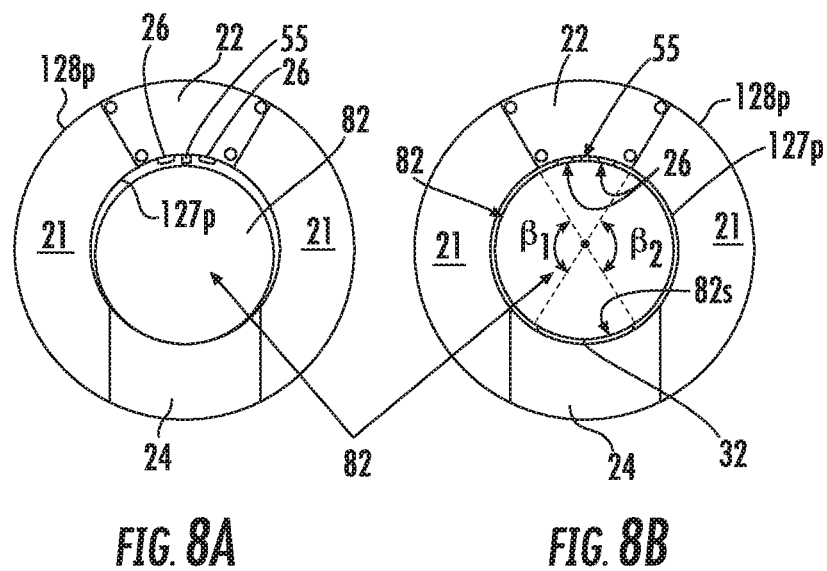
FIG. 8A and FIG. 8B are front views of the temperature measuring device showing different relative positions of components using the fastener assembly and adjustment assembly according to embodiments of the present invention.

The bracket 32 can have an inner surface 32$i$ that is arcuate, typically with a radius of curvature that corresponds to the inner perimeter 127$p$ and/or target contact 82 (FIGS. 8A, 8B). The bracket 32 can be attached to and move relative to a housing member 31 that can be attached to the primary body 21 of the measuring device 10. The inner surface 32$i$ of the bracket 32 will touch the contact surface 82$s$ (FIG. 8B) avoiding the contact 82 (FIGS. 8A, 8B) from touching the remainder of a lower circle inner surface of underlying part of the temperature segment 22 and/or arm 121.

Referring to FIG. 3A, the fastener assembly bracket 32 can have a circumferential extent or angle "α" that is between 30-90 degrees, typically between about 45 to about 75 degrees, inclusive thereof.

The worm gear 34 can rotate the gear wheel 33 to extend or retract the bracket 32. Thus, a user can fasten the bracket 32 into a desired position relative to the contact surface 82$s$ (FIGS. 8A, 8B) by rotating the worm gear 34 via the screw slot 34$s$.

Referring to FIG. 3B, the fastener assembly 24 can include a pair of planar plates 35 that hold the gear wheel 33 and the worm gear 34 therebetween, attached to the housing member 31.

The dimensions of the gear wheel 33 and worm gear 34 are closely related with the size of the primary body 21 and the angle α in FIG. 3A. For example, in some embodiments, according to the angle α range 30-90 degrees, the range of the outer diameter of the gear wheel 33 is about 5 mm to about 12 mm and the size of the worm gear 34 matably engages the chosen gear wheel 33. The gears 33, 34 can comprise any suitable material and can be electrically and/or thermally insulating, at least heat-resistant with sufficient strength. One example of a suitable material is phenolic resin. The bracket 32 can comprise any suitable material, and is also preferably electrically insulating and heat-resistant with sufficient strength, although metal is not preferred and may comprise phenolic resin. The bracket 32 can have the same or a different material from the primary body 21 of the device 10.

In some embodiments, the term "heat resistant" means that the material can withstand operating temperatures of at least 55 degrees C. for a desired shelf life (typically up to about 150 degrees C.) without undue degradation so as to maintain its shape and function. In some embodiments, the term "heat resistant" includes sub-zero temperatures. In some embodiments, the term "heat resistant" includes operating temperatures between −55 degrees C. and 150 degrees C. The projecting member 26 can be heat resistant and comprise EPDM (Ethylene-Propylene-Diene Monomer).

Referring to FIG. 4, the gear wheel 33 can be attached to or include a screw bolt 37 which rotates together with the gear wheel 33. The bolt 37 cooperates with a threaded channel 32c in the bracket 32 and transmits the rotation motion to linear motion so the bracket 32 can move to fasten the device 10 in position.

FIGS. 5A, 5B, 5C and 6 illustrate a temperature measuring segment 22 of the device 10. The temperature measuring segment 22 can comprise a double-adjustable structure of the thermal probe 55. The segment 22 can include a housing member 51 that is attached to the primary body 21 of the device 10. The housing member 51 can hold a primary body 52b of a temperature sensor 52. The primary body 52b of the temperature sensor 52 can comprise the thermal sensor 52, a processor 52p and a wireless communication chip 52c, typically enclosed an on a printed circuit board 52p. The segment 22 can also comprise at least one resilient member 53, shown as at least one leaf spring 53. The at least one resilient member 53 can be curved in a direction that faces the outer perimeter 128p of the device 10. The bracket 54 can reside in a channel 51c in the housing member 51.

A medial location of the bracket 32 of the fastener assembly segment 24 can be diametrically opposed to the thermal probe 55 as shown in FIG. 5A.

The thermal probe 55 and the primary body 52b of the sensor 52 can radially extend and retract as a unit relative to the inner perimeter of the device 10.

When the inner housing 65 with the temperature sensor 52 moves radially outward (shown as upward in the orientation shown), it can compress the at least one resilient inner member 63 and/or outer resilient member 53 and provide an opposing force to the sensor probe 55 to ensure a firm and/or thorough abutment (touching) of the sensor probe 55 to the contact 82 (FIG. 8).

The housing member 51 can include a shaped cavity 122 (FIG. 5B, 6, 7A-7C) that holds the sensor body 52b and resilient member 53. The housing member 51 can also provide the at least one projecting member 26 to be adjacent the probe 55. The at least one projecting member(s) 26 can be held in a fixed position.

As shown in FIGS. 5B, 5C and 6, the at least one projecting member 26 can be two adjacent members 26 separated by an open housing channel 51c that slidably receives the temperature probe 55 and/or leg 55s thereof.

FIGS. 5B and 6 shows an outer portion 51o portion of the housing 51 and the shaped cavity 122 holding the at least one resilient member 53 therein. The shaped cavity 122 has an outer wall 122w that is in a static or fixed position. The shaped cavity 122 has an outer portion that faces the outer perimeter 128p of the device 10. The housing 51 can hold an outer shell (which can also be called a case) 61 that holds an inner shell (that can also be called a case) 65, each forward of the at least one resilient member 53. The outer and inner shells 61, 65 can move radially relative to the housing 51. The inner shell 65 holds the temperature sensor 52. The outer shell 61 holds the inner shell 65 and at least one inner resilient member 63, shown as first and second spaced apart inner leaf springs 63, between the inner shell 65 and an adjacent inner surface 61i of a wall 61w of the outer shell 61.

While the at least one resilient member 53 and/or 63 may comprise one or more leaf springs, other resilient members can be used. For example, Belleville springs, singular or stacked, coil springs, clover springs, or any other type of flexible elastic member or spring memory device including, for example, elastomeric O-rings, flexible washers or plugs and the like to provide a desired spring force. Combinations of different components can be used.

The temperature probe 55 can be attached to an intermediate leg or extension segment 55s that connects and extends between the primary body of the sensor 52b and the external probe 55. In a non-loaded configuration, the end of the segment 55e and the probe 55 can extend outside the bracket 54 as shown in FIG. 6. In some embodiments, the distance between the temperature probe 55 and the bracket 54 in a full extension (non-loaded) position is 0 (if the manufacturing tolerances allow) to about 0.8 mm (limited by the structure of some embodiments). The bracket 54 can be a monolithic component of the outer shell 61. The bracket 54 can be elongate and may have any suitable shape such as, but not limited to, cylindrical, rectangular or planar or have any other shape.

The sensor probe 55 and intermediate leg 55s can be linked with the PCB 52p, and the PCB 52p is inside the inner shell 65 (FIG. 5B, 6). So the thermal probe 55, the intermediate leg 55s, PCB 52p and inner shell 65 can move together and relatively with the bracket 54 and outer shell 61. The bracket 54 can be elongate. If so, the distance between the probe 55 and bracket 54 can meet the dimensional spacing described above.

The at least one inner resilient member 63 can comprise first and second leaf springs 63 that can be laterally spaced apart and positioned on opposing end portions of the primary body 52b of the sensor 52 and can extend between the primary sensor body 52b and the at least one resilient member 53.

The temperature monitoring segment 22 can have a double-adjustable structure, with a primary adjustable structure 22p with the at least one resilient member 53 and a secondary adjustable structure that 22s comprises the at least one inner resilient member 63. The primary adjustment structure 22p allows for movement of the inner shell 65 with the probe 55 and sensor body 52b relative to the outer perimeter 128p of the device 10. The secondary adjustment structure 22s allows the probe 55 to retract relative to the bracket 54.

The sensor probe 55 may be structurally weak and may, without support, not be able to endure the force from contact with the contact 82 (FIG. 8A) when fastening. The bracket 54 in the housing member 51 can protect the sensor probe 55 from direct force. However, due to typical manufacturing variances, the bracket 54 may be sized with a shorter length than the length of the probe between the primary body 52b and the probe 55. A secondary adjustable structure 22s can be employed and used with the bracket 54. Upon a first force from engagement with a contact, the inner shell 65 can be compressed firstly until the sensor probe 55 touches the bracket 54, and then the outer shell 61 is compressed with the bracket 54 enduring the force. So, the inner leaf springs 63 are designed to be much weaker than the outer resilient member 53, which can be a leaf spring. As a result, the sensor probe 55 can be protected.

Figures 7A, 7B, 7C:
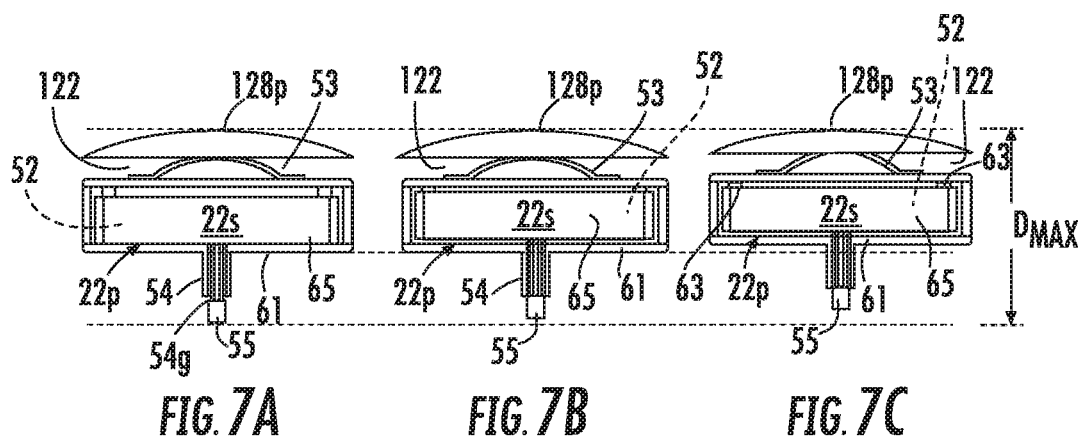
FIG. 7A-FIG. 7C illustrate exemplary different radial positional adjustment states of the temperature probe held by the adjustment assembly shown in FIG. 6 according to embodiments of the present invention.

FIG. 7A, FIG. 7B, and FIG. 7C illustrate three representative positional states of the probe 55. The three parallel dashed/broken lines are the lines to describe the three relative operational positions. The outer dashed line represents the outer perimeter of the device 128p having the cavity 122 and this distance is constant and fixed. The intermediate line represents a location of the wall 61w of the outer shell in a fully extendable location relative to the outer perimeter 128p of the primary adjustable structure 22p and the lower line represents the forwardmost position of the probe 55 allowed by the secondary adjustable structure 22s.

FIG. 7A illustrates an original state and/or position where both the primary and secondary adjustable structures 22p, 22s are in a respective bottom (radially forward) positon with a distance Dmax between the outer perimeter 128p of the device 10 and the tip of the probe 55i. The sensor probe 55 is also in its fully extended state and the sensor bracket 54 is spaced apart from the sensor probe 55 with a gap space 54g therebetween.

FIG. 7B illustrates a first compression state and/or position where only the secondary adjustable structure 22s is compressed as the at least one inner resilient member 63 (i.e., leaf springs) is compressed. The at least one inner resilient member 63 (i.e., leaf springs) has a smaller spring force F1 (i.e., is much weaker) than the spring force F2 applied by the outer resilient member 53, so the primary adjustable structure 22p with the outer resilient member 53 is not compressed or is partially compressed. F2 can be 2-10× greater than F1, more typically 3×-4× greater than F1, in some particular embodiments, F1 is about 3-4 N and F2 is about 10-12 N. As shown, the sensor probe 55 retracts and touches the sensor bracket 54. The bracket 54 can fully protect the sensor probe 55 from undue contact force.

FIG. 7C illustrates a second compression state and/or position. The primary adjustable structure 22p is further compressed relative to either of the first and second states. At this time, the primary and secondary adjustable structures 22p, 22s and/or the inner and outer shells 61, 65 can move together to an end position. Thus, the sensor probe 55 can be protected.

FIG. 8A and FIG. 8B illustrate a comparison of the device 10 before and after fastening to the contact 82. A circumferential outline of the contact surface 82s is shown with respect to the inner perimeter 127p of the device 10. As shown, two inwardly projecting members 26 extending from the inner perimeter 127p can be applied to support the contact 82 and reduce an area associated with abutting or touching area. The bracket 32 of the fastener assembly 24 can adjust the position of the temperature monitoring segment 22 so that the device 10 places the center channel or aperture 27 to be concentric with the contact 82.

FIG. 8A illustrates an initial position and orientation during assembly or installation of the temperature monitoring device 10 to the contact 82. FIG. 8B is an example of a suitable assembled state when the fastener assembly 24 is adjusted using the cooperating gears 33, 34 and the bracket 32 and with the primary and secondary adjustment structures 22p, 22s compressed.

As shown in FIG. 8B, the only physical contact (touching parts) between the device 10 and the contact 82 are the two projecting members 26, the temperature probe 55 and the fastening bracket 32 greatly reducing the touching area relative to the device shown in FIGS. 1A-1C. This provides a gap or ventilation space 30 over an angular distances $\beta_1$, $\beta_2$ on each side of the device 10 between the temperature monitoring segment 22 and the fastener assembly 24. The angular distances $\beta_1$, $\beta_2$, can be the same or different and are typically each between 30 and 90 degrees.

Out of completeness, a discussion on forces chosen for the resilient members 53, 63 is provided below using the example of leaf springs. However, it will be appreciated by one of skill in the art that similar rationales and calculations may be used for other resilient member configurations and/or types. Furthermore, this discussion is by way of example only as different devices may have different size and force requirements/considerations.

With respect to the inner leaf spring(s) 63, the resistant force should not be too large as excessive force may be loaded to the sensor probe 55 which may cause damage. Also, the force provided by the inner leaf spring(s) 63 should be smaller than that of the outer one 53. Otherwise, the outer shell 61 can move before the inner shell 65 which may result in a loss of a sensor-protecting function by the shaft 54.

To calculate the leaf spring size, a relationship between the load and a compressed distance can be constructed. First, a simplified model of a force analysis for a leaf spring is shown in FIG. 9.

$$F_1 = 2F_2 \qquad \text{Equation 1}$$

Figure 9:
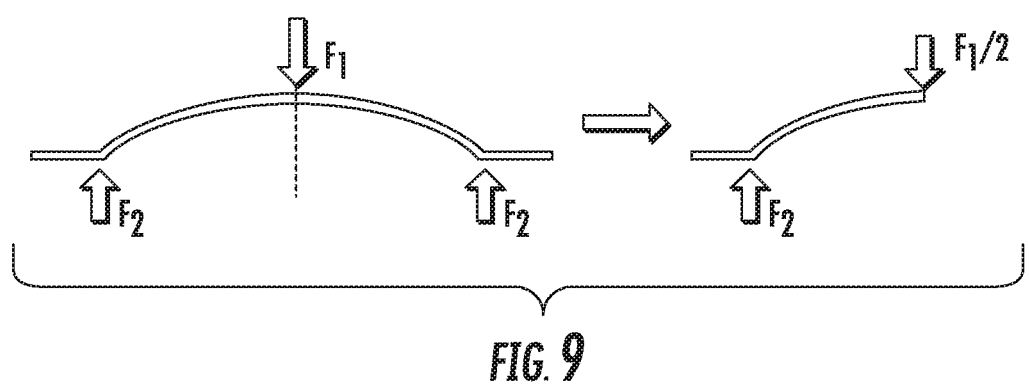
FIGS. 9-12 are schematic illustrations of a force analysis of a leaf spring according to embodiments of the present invention.

The diagram can be simplified to half as shown on the right side of FIG. 9.

$$\frac{F_1}{2} = F_2 \qquad \text{Equation 2}$$

Figure 10:
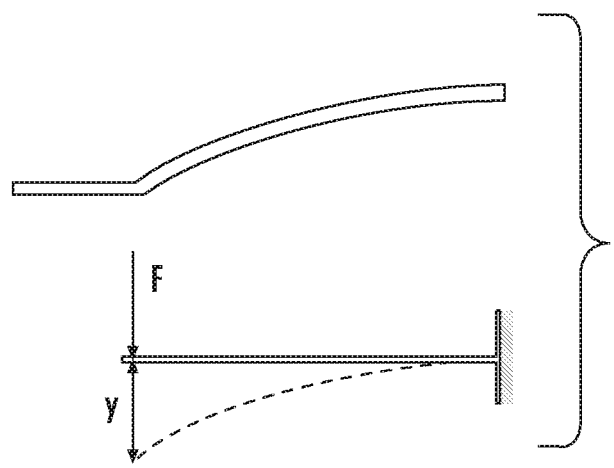

Half of a leaf spring can be equivalent to a pressed cantilever as shown in FIG. 10. For a cantilever, the end deflection y can be calculated by Equation 3.

$$y = \frac{Fl^3}{3EI} \qquad \text{Equation 3}$$

Where F is the end load, l is the length of the beam, E is the elastic modulus of the material and I is the moment of inertia of the section.

Thus, force can be expressed by Equation 4.

$$F = \frac{3EIy}{l^3} \qquad \text{Equation 4}$$

This can be simplified to Equation 5.

$$F = f(y) \qquad \text{Equation 5}$$

In this situation, the load process of the half leaf spring is contrary to that of cantilever. For the cantilever, it's assumed that with the deflection $y_0$, the load $F_0$ is expressed by Equation 6.

$$F_0 = \frac{3EIy_0}{l^3} \qquad \text{Equation 6}$$

Figure 11:
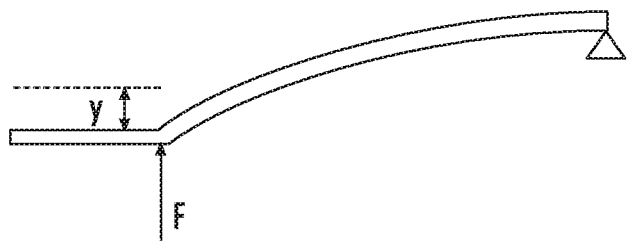

With the deflection $y_0$, the beam is annealed and its shape is solid and represents a leaf spring. So for the leaf spring, in the deflection $y_0$, the force is 0. While it is pressed to level state, the force will be equal to $F_0$. FIG. 11 shows the load F and the deflection y of the half leaf spring. The relation between them is:

$$F_x = F_0 - f(y_0 - y_x) \qquad \text{Equation 7}$$

$F_x$ and $y_x$ represent the load and deflection of the leaf spring in a certain point.

$$F_x = F_0 - f(y_0) + f(y_x) \qquad \text{Equation 8}$$

As $$F_0 = f(y_0) \quad \text{Equation 9}$$

Then $$F_x = f(y_x) \quad \text{Equation 10}$$

So for half leaf spring, $$F = \frac{3EI}{l^3} y \quad \text{Equation 11}$$

Figure 12:
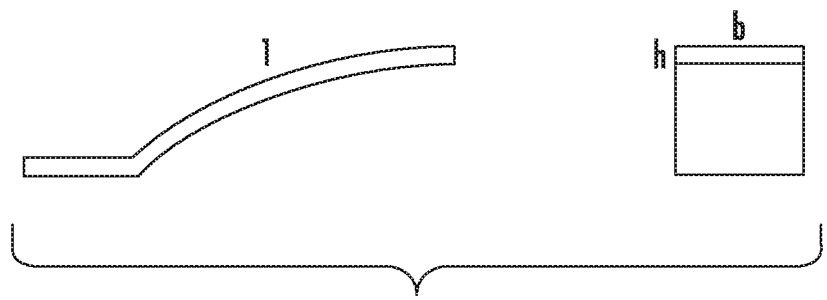

By way of example, the material of the leaf spring can be spring steel, whose elastic modulus E is 196000 MPa. And the moment of inertia of the leaf spring section I is:

$$I = \frac{bh^3}{12} \quad \text{Equation 12}$$

where b is the width of the section and h is the thickness, as shown in FIG. 12.

In some embodiments, the at least one inner resilient member 63 can be provided as two inner leaf springs, which equals four half leaf springs. According to the space, and the allowed moving distance, the size of the leaf spring can be designed to be: b=1 mm, h=0.2 mm, 1=6 mm (which means an overall length of the leaf spring is 12 mm). Calculated by the above formula, within the allowed distance y=0.5 mm, the maximum force is 0.907 N. As for two leaf springs, the whole force is (0.907*4=) 3.628 N, which is acceptable, not loading too large a force to the sensor probe 55.

For the outer resilient member 53, where a single leaf spring is used, this is equal to two half leaf springs. Likewise, the size is: b=3 mm, h=0.6 mm, 1=8 mm (which means the overall length is 16 mm). Also calculated by the above formula, within the allowed distance y=0.1 mm, the maximum force is 6.202 N. Thus, the whole force F2 is (6.202*2=) 12.404 N, which is larger than the inner force F1, and not too large for installation.

Figure 13:
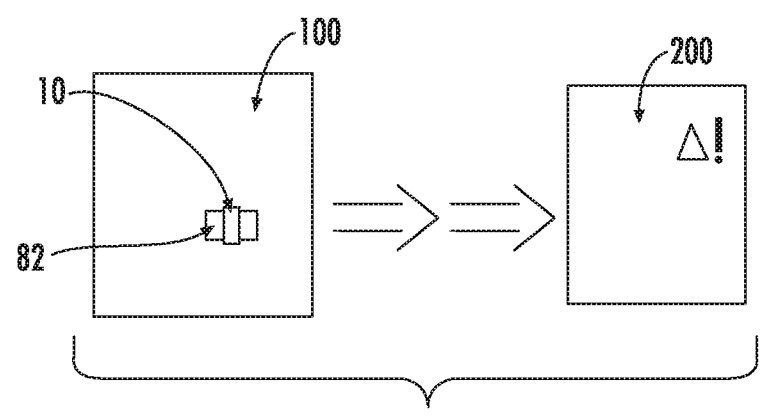
FIG. 13 is a schematic illustration of a switchgear with at least one onboard temperature monitoring device such as that shown in FIGS. 2A-2C, for example, according to embodiments of the present invention.

FIG. 13 is a schematic illustration of a switchgear 100 with at least one onboard temperature monitoring device 10 that can be placed in at least one location for monitoring temperature of a target contact 82. In some embodiments, the switchgear 100 can include multiple temperature monitoring devices 10. The at least one device 10 can wirelessly communicate with at least one remote control or monitoring station 200.

Figure 14:
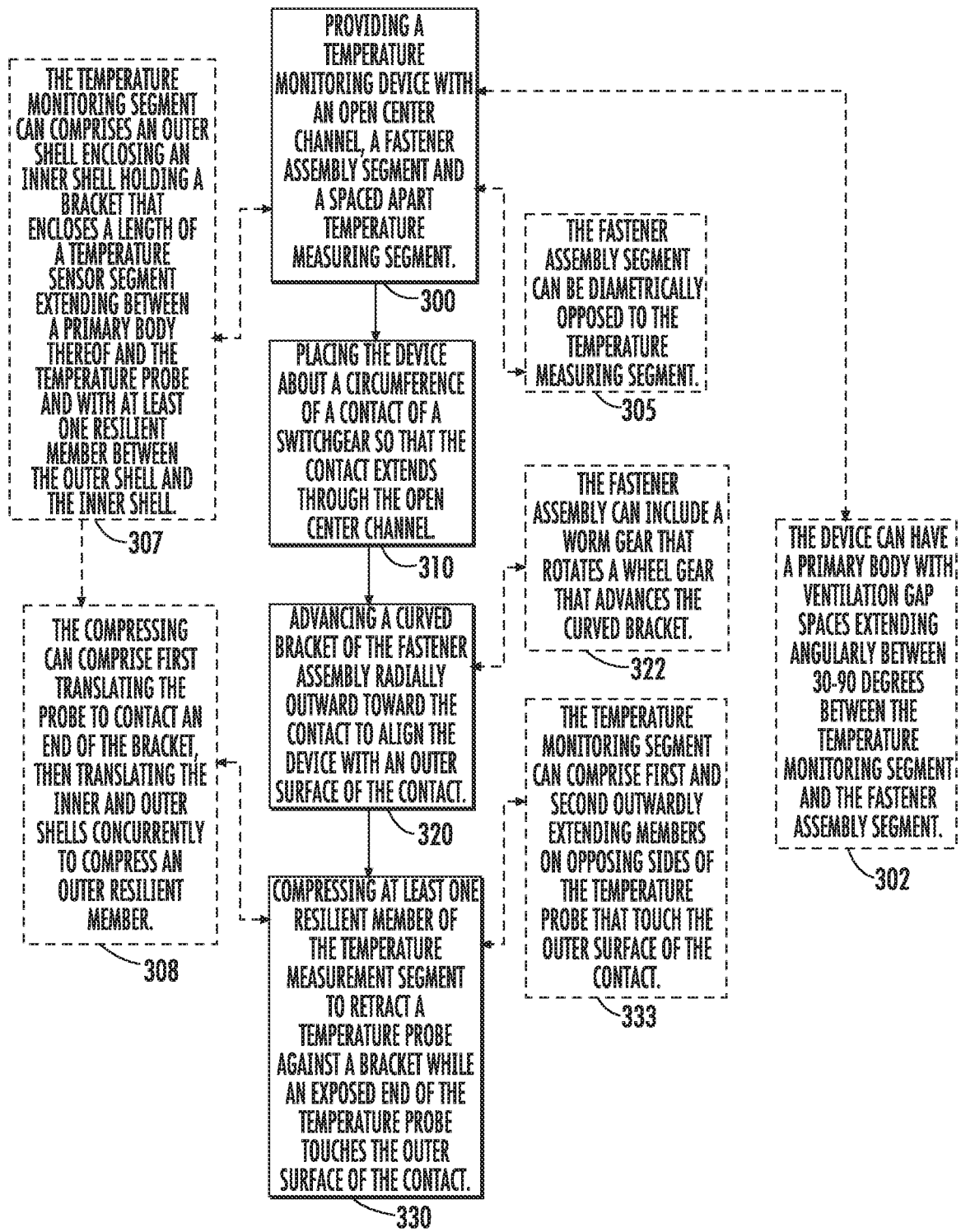
FIG. 14 is a flow chart of actions that can be used to assemble and/or adjust a temperature sensor relative to a target contact according to embodiments of the present invention.

FIG. 14 is a flow chart of an installation method according to embodiments of the present invention. A temperature monitoring device with an open center channel, a fastener assembly segment and a spaced apart temperature measuring segment is provided (block 300). The device is placed about a circumference of a contact of a switchgear so that the contact extends through the open center channel (block 310). A curved bracket of the fastener assembly can be advanced radially outward toward the contact to align the device with an outer surface of the contact (block 320). At least one (typically a plurality) resilient member of the temperature measurement segment can be compressed to retract a temperature probe against a bracket while an exposed end of the temperature probe touches the outer surface of the contact (block 330).

The device can have a primary body with ventilation gap spaces extending angularly between 30-90 degrees between the temperature monitoring segment and the fastener assembly segment (block 302) which can vent heat and reduce heat dissipation performance degradation.

The temperature monitoring segment can include an outer shell enclosing an inner shell holding a bracket that encloses a length of a temperature sensor segment extending between a primary body thereof and the temperature probe and with at least one resilient member between the outer shell and the inner shell (block 307). The compressing can include first translating the probe to contact an end of the bracket, then translating the inner and outer shells concurrently to compress an outer resilient member (block 308).

The fastener assembly segment can be diametrically opposed to the temperature measuring segment (block 305).

The fastener assembly can include a worm gear that rotates a wheel gear that advance the curved bracket (block 322).

The temperature monitoring segment can comprise first and second outwardly extending members on opposing sides of the temperature probe that touch the outer surface of the contact (block 333). These members may have convex curved surfaces.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A method of installing a temperature monitoring device into a switchgear, comprising:
    providing a temperature monitoring device with an open center channel, a fastener assembly segment and a spaced apart temperature monitoring segment, the temperature monitoring segment comprising a thermal probe;
    placing the temperature monitoring device about a circumference of a contact of a switchgear so that the contact extends through the open center channel;
    radially advancing a circumferentially extending bracket of the fastener assembly segment toward the contact to align the device with an outer surface of the contact; and
    compressing at least one resilient member of the temperature monitoring segment to retract the thermal probe while an exposed end of the thermal probe touches the outer surface of the contact.

2. The method of claim 1, wherein the temperature monitoring device has a primary body with ventilation gap spaces extending angularly between 30-90 degrees between the temperature monitoring segment and the fastener assembly segment, the method further comprising venting heat from the ventilation gap spaces thereby reducing heat dissipation performance degradation.

3. The method of claim 1, wherein the at least one resilient member comprises a first resilient member and a second resilient member, wherein the temperature monitoring segment includes an outer shell enclosing an inner shell, wherein the outer shell defines or holds an elongate bracket that encloses a length of a leg extending between a primary body of a temperature sensor and the thermal probe with the leg merging into the thermal probe positioned outside the elongate bracket, wherein the first resilient member is between the outer shell and the inner shell and the second resilient member is between the outer shell and an outer perimeter of the temperature monitoring device, and wherein the compressing is carried out by first translating the thermal probe to contact an end of the elongate bracket, then translating the inner and outer shells concurrently to compress the second resilient member.

4. The method of claim 1, wherein the fastener assembly segment is circumferentially spaced apart from the temperature monitoring segment, and wherein the circumferentially extending bracket has a circumferential extent that is in a range of about 30-90 degrees.

5. The method of claim 1, wherein the temperature monitoring device has a primary body with an inner circular perimeter that surrounds the open channel, wherein the primary body further comprises an outer circular perimeter, and wherein the primary body has a longitudinal extent that is less than a longitudinal extent of the temperature monitoring segment and the fastener assembly segment to thereby provide ventilation spaces.

6. The method of claim 1, wherein the circumferentially extending bracket has an arcuate inner surface facing the open channel with a radius of curvature corresponding to a radius of an inner circular perimeter of a primary body of the temperature monitoring device.

7. The method of claim 1, wherein the circumferentially extending bracket comprises a threaded center channel that receives a threaded bolt, the method further comprising extending the bracket by rotating the threaded bolt in the threaded center channel.

8. The method of claim 1, wherein a medial location of the circumferentially extending bracket of the fastener assembly segment is diametrically opposed to the thermal probe.

9. The method of claim 1, wherein the temperature monitoring segment further comprises a thermal sensor and an elongate channel, the elongate channel aligned with the thermal probe, wherein the thermal probe comprises a leg that extends in the elongate channel and that couples the thermal probe to the thermal sensor, and wherein the method further comprises radially extending and retracting the thermal probe and the thermal sensor as a unit relative to an inner circular perimeter of a primary body of the temperature monitoring device surrounding the open channel of the temperature monitoring device.

10. The method of claim 1, wherein the temperature monitoring segment further comprises a wireless digital thermal sensor coupled to or integral with the thermal probe and held in the temperature monitoring segment, the method further comprising wirelessly transmitting temperature data to a remote monitoring and/or control station.

11. The method of claim 1, wherein the temperature monitoring segment comprises first and second outwardly extending members, one on each side of the thermal probe that touch the outer surface of the contact.

12. The method of claim 11, wherein the first and second outwardly extending members comprise outer facing convex curved surfaces that face the outer surface of the contact.

13. The method of claim 1, wherein the temperature monitoring segment comprises first and second outwardly projecting members aligned with and circumferentially spaced apart from the thermal probe, one on each side of the thermal probe that face the outer surface of the contact.

14. The method of claim 13, wherein the first and second outwardly projecting members are at least one of flexible or comprise an elastic material, wherein the method further comprises radially compressing the first and second outwardly projecting members a range of 1-20% in response to a force applied during installation to the contact.

15. The method of claim 1, wherein the at least one resilient member comprises at least one inner resilient member and at least one outer resilient member, and wherein the temperature monitoring segment further comprises:
an inner shell, the inner shell holding a digital wireless temperature sensor that is attached to the thermal probe; and
an outer shell that encloses the inner shell, the outer shell comprising a radially extending bracket, wherein the radially extending bracket encloses a length of a leg of the thermal probe that extends between the digital wireless temperature sensor and the thermal probe,
wherein the at least one inner resilient member resides between the inner shell and the outer shell and the at least one outer resilient member resides between the outer shell and an outer perimeter of the temperature monitoring device,
wherein, during installation and application of a force onto the thermal probe, the compressing step comprises compressing the at least one inner resilient member so that the inner shell moves relative to the outer shell to retract the thermal probe against a distal end of the radially extending bracket, and compressing the at least one outer resilient member when the inner and outer shell move together radially outward toward an outer perimeter of the temperature monitoring device.

16. The method of claim 15, wherein the at least one inner resilient member comprises first and second spaced apart leaf springs.

17. The method of claim 15, wherein the at least one outer resilient member is a single leaf spring held in a shaped cavity of a housing member of the temperature monitoring segment.

18. The method of claim 1, wherein the fastener assembly segment comprises a first gear that cooperates with a second gear, and wherein the radially advancing is carried out by translating the first gear to translate the second gear to radially advance the circumferentially extending bracket.

19. The method of claim 18, wherein the first gear is a worm gear and the second gear is a wheel gear, wherein the wheel gear is attached to a threaded bolt that extends into a threaded channel of the circumferentially extending bracket, and wherein the worm gear rotates the wheel gear which turns the threaded bolt to radially advance the circumferentially extending bracket.

20. The method of claim 19, wherein the worm gear comprises an outer facing end having a slot, the method comprising allowing a user to access the slot to turn the worm gear and adjust a radially extending position of the circumferentially extending bracket.

* * * * *